March 20, 1951 C. J. CALDBECK 2,545,990
CONTROL SYSTEM
Filed Aug. 31, 1948
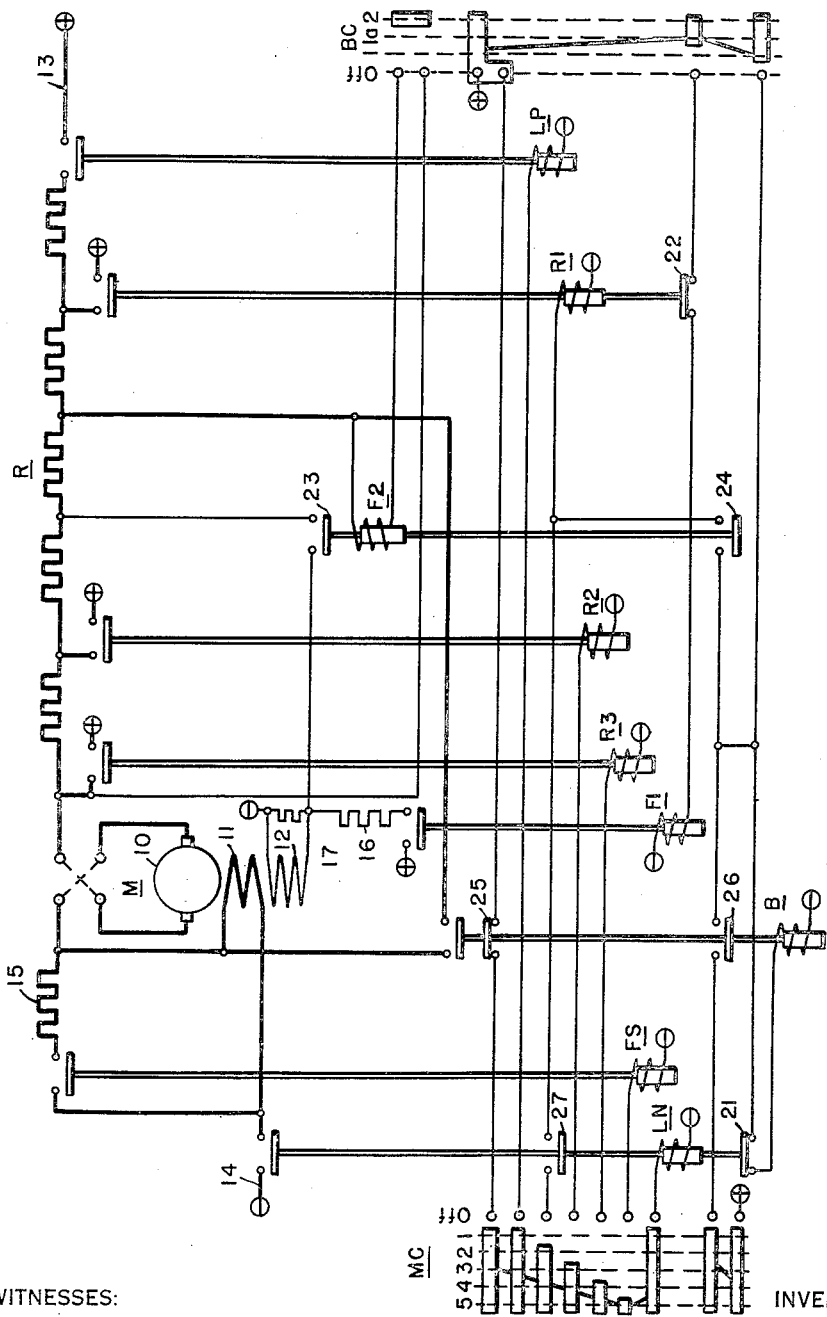
WITNESSES:
E. A. McCloskey.
N. E. Chilcott
INVENTOR
Charles J. Caldbeck.
BY G. M. Crawford
ATTORNEY Patented Mar. 20, 1951

2,545,990

UNITED STATES PATENT OFFICE 2,545,990

CONTROL SYSTEM

Charles James Caldbeck, Bradford, England, assignor to The English Electric Company Limited, London, England, a British company Application August 31, 1948, Serial No. 47,002
In Great Britain October 7, 1947

7 Claims. (Cl. 318—381)

My invention relates, generally, to dynamic braking systems and, more particularly, to a dynamic braking system for electrically propelled vehicles, such as trolley buses and the like.

In one previously known system, rheostatic or dynamic braking is obtained by connecting the motor armature across a suitable section of the starting resistance and providing excitation of the shunt or separately excited field winding of the motor from the line through a selected section of the resistance connected across the armature terminals. Two steps of dynamic braking are provided by varying the excitation of the shunt field by the closure of contactors to cut out associated resistance in series with the shunt field winding, the shunt field winding on both steps being excited from one common supply taken from the line through a section of the armature resistance.

In the foregoing scheme the starting resistance is connected to the line if the brake switch is held in either braking position at loading points with a result that there is a possibility of shocks to passengers if the insulation of the starting resistance becomes defective due to accumulation of road splash or any other cause.

Accordingly, one of the objects of the present invention is to obviate this disadvantage.

Another object of the present invention is to provided for automatically increasing the excitation of the motor as the vehicle speed decreases.

A further object of the invention is to automatically disconnect the shunt field winding from the braking resistance when the vehicle is at rest.

Still another object of the invention is to reduce the excitation of the shunt field winding when the vehicle stops.

Other objects of the invention will be explained hereinafter or will be apparent to those skilled in the art.

According to one embodiment of the present invention, the motor shunt or separately excited field winding is excited, on the first braking step, from the power supply through a series resistance and, on the second braking step, from the supply through a section of the armature braking resistance. Thus, on the first braking step the excitation is substantially constant and on the second step is increased automatically as the vehicle speed decreases. A relay, responsive to motor armature volts, disconnects the braking resistance from the supply when the vehicle speed falls below a predetermined value and the excitation of the shunt field is reduced to the first braking notch value.

For a better understanding of the nature and objects of the invention, reference may be had to the following detailed description, taken in conjunction with the accompanying drawing, in which the single figure is a diagrammatic view of a control system embodying the principal features of the invention.

Referring to the drawing, the system shown therein comprises a motor M having an armature winding 10, a series field winding 11 and a shunt or separately excited field winding 12 which is energized during dynamic braking, as will be explained more fully hereinafter. The motor M is of a type suitable for propelling an electric vehicle and may be energized through power conductors 13 and 14 which are connected to a suitable power source, such as a power generating station (not shown).

Line switches LP and LN are provided for connecting the motor to the power conductors 13 and 14, respectively. A resistor R is provided for controlling the motor current during acceleration and dynamic braking of the motor. Resistor shunting switches R1, R2 and R3 are provided for shunting the resistor R from the motor circuit step-by-step in a manner well known in the art. A field shunting switch FS is provided for shunting the series field winding 11 through a resistor 15 during a portion of the accelerating cycle. A switch B is provided for connecting the armature winding 10 of the motor across a portion of the resistor R during dynamic braking.

In order to limit the dynamic braking current and regulate the braking effect, provision is made for exciting the additional field winding 12 from a fixed voltage, such as the line supply, during the first part of the braking cycle, and then connecting the field winding 12 across the power supply in series-circuit relation with a portion of the resistor R which is in the armature circuit during dynamic braking. A switch F1 is provided for connecting the field winding 12 to the power supply in series-circuit relation with a resistor 16. If desired, a field adjusting resistor 17 may be connected in parallel-circuit relation to the field winding 12.

A relay F2 having its actuating coil connected across the armature winding 10 of the motor during the latter portion of the dynamic braking cycle is provided for controlling the connecting of the field winding 12 to the power supply in series-circuit relation with a portion of the resistor R, as will be explained more fully hereinafter. A master controller MC, which may be of the drum type, is provided for controlling the operation of the line and accelerating switches. A braking controller BC is provided for controlling the operation of the dynamic braking switches.

In order that the functioning of the foregoing apparatus may be more clearly understood, the operation system will now be described in more detail. The motor may be accelerated in the usual manner by actuating the controller MC through positions 1 to 5, first closing the switches LP and LN to connect the motor to the power source and then closing the switches R1, R2 and R3 to shunt the resistor R from the motor circuit, thereby accelerating the motor. Following the shunting of the resistor R, the field shunting switch FS is closed to shunt the series field winding 11 through the resistor 15 to attain maximum speed of the motor in a manner well known in the art.

If it is desired to decelerate the motor by dynamic braking, the master controller MC is returned to the "off" position and the braking controller BC is actuated to position 1, thereby closing the switch B through a circuit which extends through an interlock 21 on the line switch LN. The closing of the switch B connects the armature winding 10 across a portion of the resistor R to establish the dynamic braking circuit for the motor.

When the controller BC is on position 1a, the actuating coil of the switch F1 is energized through a circuit which includes an interlock 22 on the switch R1. In this manner the field winding 12 is connected to the power supply through the series resistance 16. The series resistance is of such a value that the resultant excitation of the shunt field winding 12 provides reasonable braking effort at maximum legal speeds for initial control of speed upon the brake application.

Movement of the braking control BC to position 2 is effective to connect the voltage responsive relay F2 across the armature winding 10 of the motor M which is now acting as a generator. Accordingly, the contact members 23 of the relay F2 are closed to connect the one terminal of the field winding 12 to a tap on the resistor R located at a point in the dynamic braking circuit. At the same time, an interlock 24 on the relay F2 is closed to energize the actuating coil of the resistor shunting switch R1, thereby connecting a portion of the resistor R to the positive line of the power supply. The opening of the interlock 22 on the switch R1 deenergizes the switch F1, thereby opening the circuit between the shunt field winding series resistor 16 and the positive line of supply.

The circuit to the shunt field winding 12 is now from the positive line through the switch R1, a portion of the resistor R, the contact members 23 on the relay F2 and the field winding 12 to the negative line of supply. The excitation of the shunt field winding 12 is now automatically controlled by the current flowing in the circuit and by the ohmic value of the part of the resistor R which is common to the armature and the field winding circuits.

Thus, at the higher speeds when the dynamic braking current is high, the voltage across the shunt field winding 12 is equivalent to line voltage minus the voltage drop across the part of the resistor R common to the armature winding and the field winding circuits. As the speed falls, the armature current is reduced and the voltage drop in the resistance is also reduced. The excitation of the shunt field winding 12 is therefore increased automatically as the vehicle speed decreases and the brake force is maintained at a higher value than is the case when the field excitation is fixed.

It is inherent in this scheme that the voltage responsive relay F2 opens when the motor is stationary because of the loss of holding voltage across the armature terminals. If the braking controller BC is held in an operating position at loading points, the relay F2 drops out and its associated interlock contacts open to deenergize the resistor shunt switch R1. This switch accordingly opens and the connection from the positive line to the resistor R is broken.

The control of the voltage responsive relay, as described, affords another advantage in that its opening at stops ensures that the shunt field winding does not carry for any length of time the current resulting from the application of full line voltage, and further that the shunt field winding is not damaged by overheating due to the application of full line volts at stopping points.

In addition to the interlocks already mentioned, interlocks 25 and 26 are provided on the switch B and an interlock 27 is provided on the switch LN to prevent mal-operation if the braking controller is operated when the master controller is held in a power position. It will be understood that the number of resistance steps may be increased and that any known method may be utilized for shunting the starting resistance in multiple steps.

From the foregoing description it is apparent that the present system provides for automatically regulating the dynamic braking current of a motor with a minimum amount of control apparatus. Furthermore, the system prevents overheating of the motor field winding when the motor stops at loading points for the vehicle.

Since certain changes may be made in the above-described construction and different embodiments of the invention may be made without departing from the spirit and scope thereof, it is intended that all the matter contained in the above description and shown in the accompanying drawing shall be considered as illustrative and not in a limiting sense.

I claim as my invention:

1. In a control system, in combination, a motor having an armature winding, a series field winding and an additional field winding, power conductors, switching means for connecting the armature winding and the series field winding to the power conductors, resistance means for controlling the motor current, additional switching means for connecting the resistance means across the armature winding for dynamic braking, a switch for connecting the additional field winding to the power conductors during one part of the dynamic braking cycle, and additional switches for connecting the additional field winding to the power conductors through said resistance means connected in the dynamic braking circuit during another part of the dynamic braking cycle.

2. In a control system, in combination, a motor having an armature winding, a series field winding and an additional field winding, power conductors, switching means for connecting the armature winding and the series field winding to the power conductors, resistance means for controlling the motor current, additional switching means for connecting the resistance means across the armature winding for dynamic braking, a switch for connecting the additional field winding to the power conductors during the first part of the dynamic braking cycle, and additional switches for connecting the additional field winding to the power conductors through said resistance means connected in the dynamic braking circuit during the remainder of the dynamic braking cycle.

3. In a control system, in combination, a motor having an armature winding, a series field winding and an additional field winding, power conductors, switching means for connecting the armature winding and the series field winding to the power conductors, resistance means for controlling the motor current, additional switching means for connecting the resistance means across the armature winding for dynamic braking a switch for connecting the additional field winding to the power conductors during one part of the dynamic braking cycle, additional switches for connecting the additional field winding to the power conductors through said resistance means connected in the dynamic braking circuit, and a controller for controlling the operation of said switches.

4. In a control system, in combination, a motor having an armature winding, a series field winding and an additional field winding, power conductors, switching means for connecting the armature winding and the series field winding to the power conductors, resistance means for controlling the motor current, additional switching means for connecting the resistance means across the armature winding for dynamic braking, a switch for connecting the additional field winding to the power conductors during the first part of the dynamic braking cycle, additional switches for connecting the additional field winding to the power conductors through said resistance means connected in the dynamic braking circuit during the remainder of the dynamic braking cycle, and a controller for controlling the operation of said switches.

5. In a control system, in combination, a motor having an armature winding, a series field winding and an additional field winding, power conductors, switching means for connecting the armature winding and the series field winding to the power conductors, resistance means for controlling the motor current, additional switching means for connecting the resistance means across the armature winding for dynamic braking, a switch for connecting the additional field winding to the power conductors during the first part of the dynamic braking cycle, relay means responsive to the armature voltage, and switching means controlled by said relay means for connecting the additional field winding to the power conductors through said resistance means connected in the dynamic braking circuit during the remainder of the dynamic braking cycle.

6. In a control system, in combination, a motor having an armature winding, a series field winding and an additional field winding, power conductors, switching means for connecting the armature winding and the series field winding to the power conductors, resistance means for controlling the motor current, additional switching means for connecting the resistance means across the armature winding for dynamic braking, a switch for connecting the additional field winding to the power conductors during the first part of the dynamic braking cycle, relay means responsive to the armature voltage, and switching means controlled by said relay means for connecting the additional field winding to the power conductors through said resistance means connected in the dynamic braking circuit during the remainder of the dynamic braking cycle, said relay means causing said resistance means to be disconnected from the power conductors when the motor stops.

7. In a control system, in combination, a motor having an armature winding, a series field winding and an additional field winding, power conductors, switching means for connecting the armature winding and the series field winding to the power conductors, resistance means for controlling the motor current, additional switching means for connecting the resistance means across the armature winding for dynamic braking, a switch for connecting the additional field winding to the power conductors during the first part of the dynamic braking cycle, relay means responsive to the armature voltage, switching means controlled by said relay means for connecting the additional field winding to the power conductors through said resistance means connected in the dynamic braking circuit during the remainder of the dynamic braking cycle, and control means for connecting said relay means across the motor armature winding.

CHARLES JAMES CALDBECK.

REFERENCES CITED

The following references are of record in the file of this patent:

UNITED STATES PATENTS

| Number | Name | Date |
|---|---|---|
| 2,198,481 | MacDonald et al. | Apr. 23, 1940 |